(12) United States Patent
Bunker et al.

(10) Patent No.: US 6,819,234 B1
(45) Date of Patent: Nov. 16, 2004

(54) VEHICLE BRAKING SYSTEM SAFETY ENHANCEMENTS

(76) Inventors: Lawrence Bunker, 147 W. Hemlock Ave., Sunnyvale, CA (US) 94085; James Bunker, 147 W. Hemlock Ave., Sunnyvale, CA (US) 94085

( * ) Notice: Subject to any disclaimer, the term of this patent is extended or adjusted under 35 U.S.C. 154(b) by 51 days.

(21) Appl. No.: 10/438,169

(22) Filed: May 13, 2003

(51) Int. Cl.[7] .............................. B60Q 1/52; G08B 3/10
(52) U.S. Cl. ...................... 340/471; 340/479; 340/384.3
(58) Field of Search ................................ 340/471, 479, 340/691.2, 693.8, 384.3, 384.1; 381/61, 86

(56) References Cited

U.S. PATENT DOCUMENTS

| | | | |
|---|---|---|---|
| 4,265,047 A | * 5/1981 | Meyer et al. | ................... 446/7 |
| 5,371,802 A | * 12/1994 | McDonald et al. | ......... 381/71.4 |
| 5,481,243 A | 1/1996 | Lurie et al. | ................... 340/467 |
| 5,635,903 A | * 6/1997 | Koike et al. | ................. 340/441 |
| 6,147,600 A | 11/2000 | Faye | ........................... 340/467 |
| 6,271,746 B1 | 8/2001 | Lisiak et al. | ............. 340/425.5 |
| 6,592,375 B2 | * 7/2003 | Gruber et al. | ................. 434/62 |

* cited by examiner

*Primary Examiner*—Donnie L. Crosland

(57) ABSTRACT

Method and system for providing an audible warning of approach of a moving vehicle that is undergoing hard braking. When hard braking is being applied and the initial vehicle velocity (just before hard braking is first applied) is at least equal to a selected threshold velocity, an artificially produced warning sound, resembling the screech or howl of one or more tires in a panic stop, is transmitted, in one or more selected angular sectors. If the initial vehicle velocity is less than the threshold velocity, the warning sound is witheld. The threshold velocity may depend upon one or more of initial velocity, initial deceleration, local road surface conditions and local weather conditions.

20 Claims, 2 Drawing Sheets

VEHICLE BRAKING SYSTEM SAFETY ENHANCEMENTS

FIELD OF THE INVENTION

This invention relates to enhancement of safety in a brake system on a moving vehicle.

BACKGROUND OF THE INVENTION

Where a vehicle, moving on a road that includes water, snow, ice, gravel, mud, dirt or similar substances, is brought to a sudden stop, this vehicle often skids to a stop without making a sound that might warn others about the sudden braking. On a dry pavement, a vehicle that does not include an anti-skid braking system (non-ABS) will usually produce a characteristic screeching or howling sound (from the tires and/or braking system) when the vehicle brakes suddenly. A vehicle equipped with an ABS will not produce a screeching or howling sound on any road surface.

Anti-skid braking systems (ABSs) for automobiles and other vehicles were introduced in 1978 or earlier and have become a standard feature for vehicles now manufactured. An ABS operates relatively silently to firmly apply brakes on a moving vehicle to quickly reduce the speed of a moving vehicle, or to bring the vehicle quickly to a stop, without causing vehicle spin-out or loss of control of the orientation of the vehicle. One potentially disagreeable feature of an ABS is that, due to the silent braking operation of an ABS, a pedestrian or vehicle occupant in the path of an ABS-equipped vehicle that is braking, and another vehicle traveling in the same lane behind this braking vehicle, receives no audible warning of the approaching/braking vehicle. This can be dangerous, for a non-ABS or ABS vehicle that brakes suddenly, because the pedestrian or other vehicle or vehicle occupant receives no audible warning of the action(s) taken by the braking vehicle and cannot react accordingly.

What is needed is a system that will provide an audible warning when a vehicle is braking sharply, but will not provide a spurious warning when the vehicle velocity is below a small velocity threshold that may vary with vehicle velocity, vehicle acceleration, and local road or weather conditions.

SUMMARY OF THE INVENTION

These needs are met by the invention, which provides a method and system that monitors activity of a braking system (ABS or non-ABS) on, and the present velocity of, a moving vehicle. When (1) hard braking in the braking system is activated, the system optionally determines (2) whether the moving vehicle present velocity (immediately before hard braking is applied) is at least equal to a selected velocity threshold, which can vary with the present vehicle deceleration. When both of the conditions, (1) and (2), are satisfied, the system provides an artificial, loud sound (a "warning sound" WS), which resembles the screeching of brakes on a non-ABS vehicle on dry pavement when the non-ABS vehicle is being brought to an abrupt stop. "Hard braking" occurs when vehicle brakes are applied with substantially maximum force, above a selected force threshold.

When the braking system is activated but the vehicle velocity is below a selected velocity threshold (e.g., 0.1–5 meters/sec), the system interprets this situation as a normal (non-panic) stop from a small velocity, and the warning sound is withheld. The threshold velocity may increase as the magnitude of the vehicle deceleration increases, or where certain road or weather conditions are present. Optionally, the warning sound WS provided by the system during vehicle braking is preferentially directed in two or more selected angular sectors relative to the moving vehicle, such as a first angular sector oriented toward the front of the moving vehicle and a second angular sector oriented toward the rear of the moving vehicle, in order to provide the warning sound for those most likely to be affected by the moving vehicle as the vehicle brakes hard.

The invention is intended to reproduce the naturally occurring, universally recognized (warning) sound of screeching tires that occurs during a panic stop of a vehicle, that does not include an automatic braking system (ABS). The system responds under all weather conditions and road surface conditions and with any type of braking system. Optionally, the warning sound is not transmitted if the vehicle velocity is very low.

DESCRIPTION OF BEST MODES OF THE INVENTION

Figure 1:
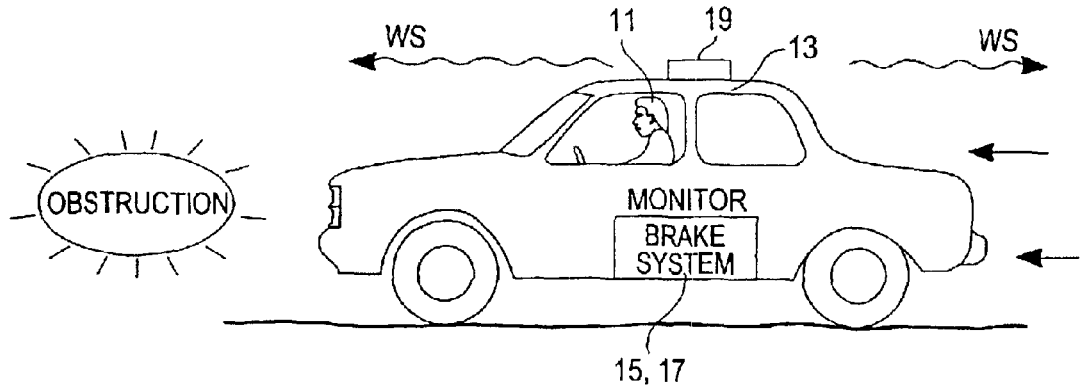
FIG. 1 illustrates an environment in which the invention can be used.

In FIG. 1, a driver 11 of a vehicle 13 activates a braking system 15 on the vehicle in order to avoid an accident or to avoid an obstruction in the moving vehicle's path. A monitoring system 17, associated with the braking system 15, senses that hard braking is being activated, determines the present vehicle velocity ("initial velocity") $v_0$ just before hard braking was activated, and compares the vehicle initial velocity $v_0$ with a selected vehicle threshold velocity $v_{thr}$, which may be in a range 0.1–5 meters/sec (more preferably, 0.1–1 meters/sec), or higher if desired, and may vary with an initial acceleratic $a_0$ deceleration $a_0$ of the moving vehicle. If the vehicle initial velocity $v_0$ is at least equal to the threshold velocity $v_{thr}$, the monitoring system 17 promptly activates a warning sound source 19 that provides an artificial, loud sound ("warning sound") WS that resembles a screech or howl of vehicle tires being quickly applied to bring a vehicle to a halt—a panic stop. The warning sound WS thus provided should resemble, as closely as possible, a screech or howl of tires of a non-ABS vehicle on dry pavement so that any person hearing this sound will instinctively recognize and react to this sound. The warning sound WS should not be some other sound, such as a high-pitched signal or pulsed signal having one or more frequencies therein, because recognition of this other sound will require application of an analytical mental process before the recipient of the warning sound WS can recognize and responde to this other sound. The sound recipient's response to the (screech or howl) warning sound WS should be visceral, instinctive and immediate, requiring little or no application of an analytical process.

Optionally, the warning sound WS will emphasise the lower frequencies present in a screech or howl of braking tires so that persons with substantial hearing loss at higher frequencies will be able to receive, recognise and respond to the warning sound.

Figure 2:
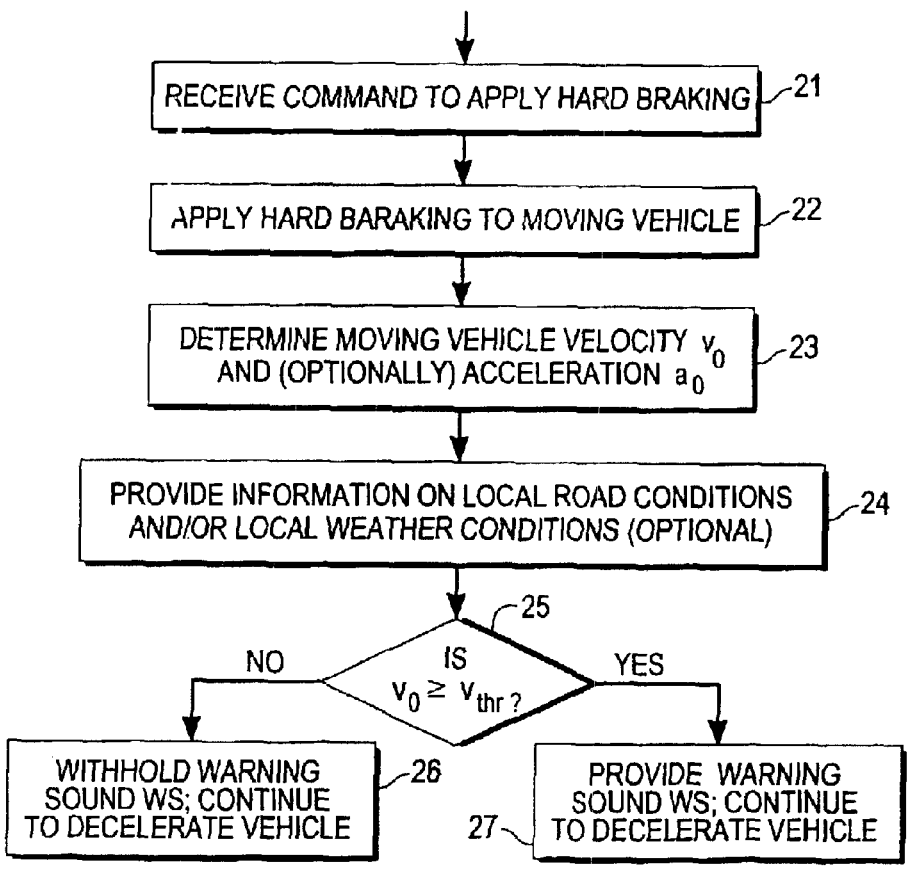
FIG. 2 is a flow chart of a procedure for practicing the invention.

FIG. 2 is a flow chart of a process the monitoring system 17 in FIG. 1 may follow in order to practice the invention. In step 21, the system receives a command to apply hard braking to a moving vehicle. In step 22, the system applies hard braking to the moving vehicle. In step 23, the system determines the moving vehicle initial velocity $v_0$ and, optionally, the moving vehicle initial acceleration $a_0$ (which can be positive, negative or zero). In step 24 (optional), the system senses or is automatically provided with information on local road surface conditions and/or weather conditions. In step 25, the system compares the moving vehicle initial velocity $v_0$ with a selected vehicle threshold velocity $v_{thr}$ and determines if $v_0$ is at least equal to $v_{thr}$. The threshold velocity $v_{thr}$ may depend upon the local road conditions and/or local weather conditions sensed in step 24. If the answer to the query in step 25 is "yes," the system provides the warning sound WS, which resembles a howl or screech of non-ABS vehicle tires being brought rapidly to a (panic) stop on dry pavement, in step 26, and continues to decelerate the moving vehicle. If the answer to the query in step 25 is "no," the system withholds provision of the warning sound WS in step 27, and continues to decelerate the moving vehicle.

Figure 3:
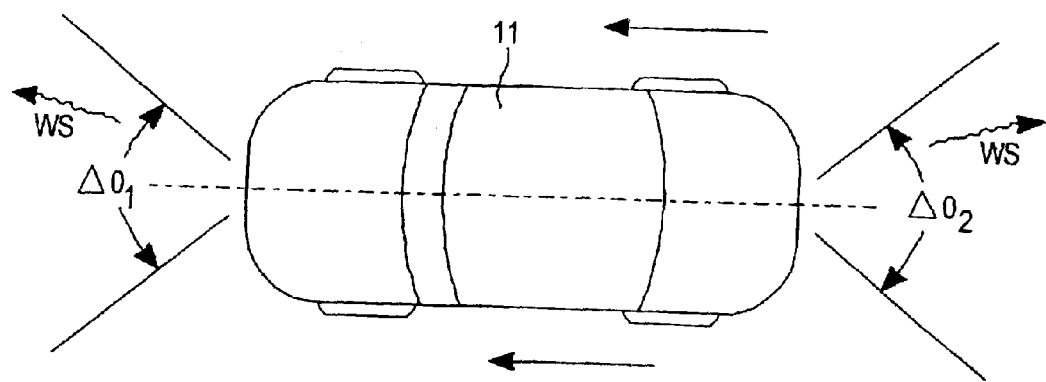
FIG. 3 illustrates two angular sectors in which the warning sound may be transmitted according to the invention.

Optionally, the warning sound WS is preferentially transmitted in one or more angular sectors, defined with reference to the present location and direction of travel of the moving vehicle. FIG. 3 illustrates a situation in which the warning sound WS is preferentially transmitted in a first angular sector A1 toward the front of the moving vehicle 31 and in a second angular sector A2 toward the rear of the moving vehicle. The warning sound WS is intended to be heard, and reacted to, by pedestrians and vehicle occupants in the angular sector A1, into which the moving vehicle is moving, and to be heard and reacted to by occupants of vehicles in the angular sector A2 that may be following the moving vehicle. The angular widths of the sectors A1 and A2 may be the same or m be different. For example, the angular widths may be 30°–90° and 20°–75° for the respective A1 and A2 sectors.

The velocity threshold $v_{thr}$ may be constant or may vary with a selected combination of initial velocity $v_0$ and initial acceleration $a_0$. As an example, consider a moving vehicle that is initially decelerating with a constant acceleration value $a_0$ (<0 for deceleration), without hard braking by the braking system. If hard braking is not applied, the velocity of the moving vehicle (beginning at t=0 and for time t>0) will be $$v(t) = v_0 + a_0 t \quad (a_0 < 0). \tag{1}$$

Figure 4:
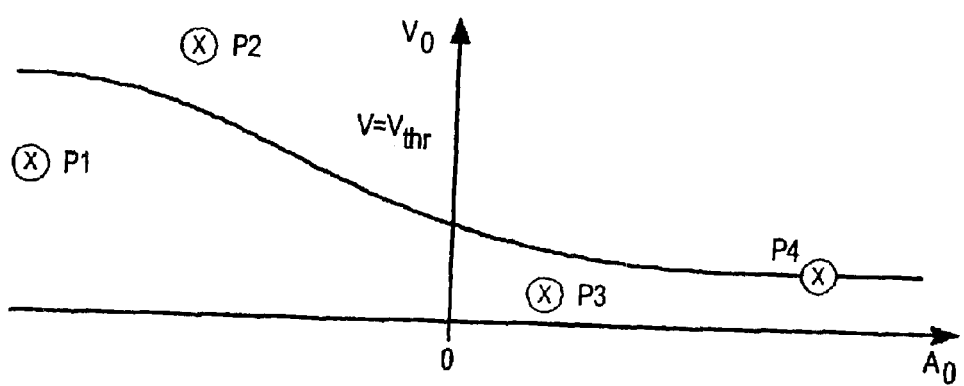
FIG. 4 graphically illustrates a curve in velocity-acceleration space that can be used to determine the velocity threshold according to the invention.

Under these conditions, the moving vehicle will come to a complete stop (without hard braking) at a time $$t_{stop} = -v0/a0 \, (>0), \tag{2}$$

and the moving vehicle will move an incremental distance $$\Delta x = -v_0^2/2a_0 \tag{3}$$

beyond its location at the time t=0. If the moving vehicle is to be brought to a stop in a distance that is no greater than a selected distance D, this can be done without application of hard braking if $D \leq -v_{thr}^2/2a_0$. This indicates that the threshold velocity may be determined as $$v_{thr} = \{2|a_0|D\}^{1/2}, \tag{4}$$

where D is a selected distance, and indicates that the threshold velocity $v_{thr}$ may increase monotonically with the magnitude $|a_0|$ of deceleration, for $a_0 < 0$. FIG. 4 graphically illustrates how the threshold velocity $v_{thr}$ may vary with the magnitude $|a_0|$ of deceleration for $a_0 > 0$. For positive deceleration ($a_0 > 0$), the threshold velocity $v_{thr}$ may become roughly constant or may continue to decrease as the acceleration value $a_0$ (>0) becomes larger. In general, one would expect the velocity threshold $v_{thr}$ to decrease approximately monotonically as the acceleration value $a_0$ (in the absence of hard braking) increases. The value used for the initial acceleration $a_0$ is preferably an average of the acceleration value for a time interval having a selected length (e.g., 0.5–2 sec) and ending at the initial time t=0.

FIG. 4 indicates the location of four representative velocity/acceleration pairs ($a_0$, $v_0$), namely, P1, P2, P3 and P4, that maybe measured by the system. The locations P1 and P3 lie below the threshold curve, $v = v_{thr}$, and these correspond to situations in which the warning sound WS would not be transmitted. The location P2 lies above the threshold curve, and the warning sound WS would be transmitted in this instance. The location P4 lies on the threshold curve; and the warning sound WS is preferably transmitted in this instance. However, the location P4 may, alternatively, correspond to a situation in which the warning sound WS is also not transmitted, possibly for other reasons.

The distance D used to determine a velocity threshold $v_{thr}$ optionally depends upon local road conditions and/or local weather conditions. If the road surface on which the moving vehicle moves is dry pavement and the humidity is relatively low (e.g., below 50 percent), it is likely that the vehicle can undergo hard braking to a complete stop in a minimum distance. In this situation, the distance D may be set relatively high, at 3–10 meters.

If the road surface contains ice, heavy snow gravel or very wet mud, or if the relative humidity is very high (e.g., $\geq 90$ percent), the moving vehicle may require a multiple m (e.g., m=2–5) of the minimum distance to come to a complete stop. In this situation, the distance D can be divided by the estimated multiple m to reduce the effective distance D used to estimate the velocity threshold $v_{thr}$. The multiple m can be estimated by an automated road conditions sensor and/or weather conditions sensor, carried on the vehicle.

The brake monitoring system and warning sound source disclosed here can be applied to any vehicle (automobile, truck, bus, SUV, motor-driven cycle, etc.), irrespective of whether the vehicle's system is ABS or non-ABS. Provision of a velocity threshold that optionally depends upon present velocity, present acceleration, local road surface conditions and/or local weather conditions can be implemented through an expanded monitoring system.

What is claimed is:

1. A method for providing an audible warning of approach of a vehicle that is undergoing vehicle braking, the method comprising:

determining if hard braking is being applied to a moving vehicle;

when hard braking is being applied, determining a vehicle initial velocity $v_0$ before hard braking was applied and providing a vehicle threshold velocity $V_{thr}$;

comparing the initial velocity with the threshold velocity; and when $v_0$ is at least equal to $V_{thr}$, providing an artificially produced warning sound that resembles the audible sound of one or more vehicle tires when a non-ABS vehicle is brought to a sudden stop.

2. The method of claim 1, further comprising withholding provision of said warning sound when said initial velocity $v_0$ is less than said threshold velocity $v_{thr}$.

3. The method of claim 1, further comprising providing said warning sound in at least one of two non-overlapping angular sectors, determined relative to said moving vehicle and a direction of movement of said moving vehicle.

4. The method of claim 3, further comprising providing said warning sound in a first angular sector having a first selected angular width and being oriented toward said direction of movement of said moving vehicle and in a second angular sector having a second selected angular width and being oriented in a direction opposite to said direction of movement of said moving vehicle.

5. The method of claim 1, further comprising determining said threshold velocity $v_{thr}$ with reference to said initial velocity $v_0$ and to a representative initial acceleration $a_0$ for said moving vehicle.

6. The method of claim 5, further comprising estimating said threshold velocity $v_{thr}$ as $\{2|a_0|D\}^{1/2}$, where D is a selected distance and said acceleration $a_0$ is negative.

7. The method of claim 6, further comprising selecting said distance D according to at least one of local road surface conditions and local weather conditions.

8. The method of claim 7, further comprising providing a first value of said distance D where said road surface is dry pavement and relative humidity is no more than about 50 percent, and providing a second value of said distance D that is less than the first value of D when at least one of two conditions is present: (1) said road surface is other than dry pavement and (2) the relative humidity is at least 90 percent.

9. The method of claim 1, further comprising providing as said moving vehicle a non-ABS vehicle.

10. The method of claim 1, further comprising providing as said moving vehicle a vehicle having an operative anti-skid braking system.

11. A system for providing an audible warning of approach of a vehicle that is undergoing vehicle braking, the system comprising a computer that is programmed:

to determine if hard braking is being applied to a moving vehicle;

when hard braking is being applied, to determine a vehicle initial velocity $v_0$ before hard braking was applied and to provide a vehicle threshold velocity $V_{thr}$;

to compare the initial velocity with the threshold velocity; and when $v_0$ is at least equal to $v_{thr}$, to provide an artificially produced warning sound that resembles the audible sound of one or more vehicle tires when a non-ABS vehicle is brought to a sudden stop.

12. The system of claim 11, wherein said computer is further programmed to withhold said warning sound when said initial velocity $v_0$ is less than said threshold velocity $v_{thr}$.

13. The system of claim 11, wherein said computer is further programmed to provide said warning sound in at least one of two a non-overlapping angular sectors, determined relative to said moving vehicle and a direction of movement of said moving vehicle.

14. The system of 13, wherein said computer is further programmed to provide said warning sound in a first angular sector having a first selected angular width and being oriented toward said direction of movement of said moving vehicle, and in a second angular sector having a second selected angular width and being oriented in a direction opposite to said direction of movement of said moving vehicle.

15. The system of claim 14, wherein said computer is further programmed to determine said threshold velocity $v_{thr}$ with reference to said initial velocity and to a representative initial acceleration $a_0$ for said moving vehicle.

16. The system of claim 15, wherein said computer is further programmed to estimate said threshold velocity $v_{thr}$, as $\{2|a_0|D\}^{1/2}$, where D is a selected distance and said acceleration $a_0$ is negative.

17. The system of claim 16, wherein said computer is programmed to select said distance D according to at least one of local road surface conditions and local weather conditions.

18. The method of claim 17, wherein said computer is programmed to provide a first value of said distance D where said road surface is dry pavement and relative humidity is no more than about 50 percent, and to provide a second value of said distance D that is less than the first value of D when at least one of two conditions is present: (1) said road surface is other than dry pavement and (2) the relative humidity is at least 90 percent.

19. The system of claim 11, wherein said moving vehicle is a non-ABS vehicle.

20. The system of claim 11, wherein said moving vehicle has an operative anti-skid braking system.

* * * * *

UNITED STATES PATENT AND TRADEMARK OFFICE
CERTIFICATE OF CORRECTION

PATENT NO. : 6,819,234 B1 Page 1 of 1
APPLICATION NO. : 10/438169
DATED : November 16, 2004
INVENTOR(S) : Lawrence Bunker and James Bunker It is certified that error appears in the above-identified patent and that said Letters Patent is hereby corrected as shown below:

Title Page (57) ABSTRACT, lines 7-8: "..., is transmitted, in one or more selected angular sectors. ..." should read: --..., is transmitted, in all directions or in one or more selected angular sectors. ...--.

Column 2, lines 42-43: "..., and may vary with an initial acceleratic $a_0$ deceleration $a_0$ of the moving vehicle. ..." should read --, and may vary with an initial acceleration-deceleration $a_0$ of the moving vehicle. ...--

Column 4, lines 2-3: "...threshold velocity $V_{thr}$ may vary with the magnitude $|a_0|$ of deceleration for $a_0>0$. ..." should read -- threshold velocity $V_{thr}$ may vary with the magnitude $|a_0|$ of deceleration for $a_0<0$. ...-- .

Signed and Sealed this

Second Day of January, 2007

JON W. DUDAS
*Director of the United States Patent and Trademark Office*